United States Patent [19]

Treharne et al.

[11] 4,256,967

[45] Mar. 17, 1981

[54] ARC REACTOR DEVICE

[75] Inventors: Richard W. Treharne, Xenia; Charlton K. McKibben, Dayton; Donald R. Moles; Mitchell R. M. Bruce, both of Yellow Springs, all of Ohio

[73] Assignee: Charles F. Kettering Foundation, Dayton, Ohio

[21] Appl. No.: 60,537

[22] Filed: Jul. 25, 1979

[51] Int. Cl.³ ............................................. C01B 21/32
[52] U.S. Cl. .................................. 250/544; 250/547; 422/186
[58] Field of Search ............... 250/542, 544, 545, 547; 422/186

[56] References Cited

U.S. PATENT DOCUMENTS

| | | | |
|---|---|---|---|
| 1,130,941 | 3/1915 | Summers | 204/179 |
| 1,232,179 | 7/1917 | Barfoed | 250/544 |
| 1,453,435 | 5/1923 | Buettner | 204/179 |
| 1,586,823 | 6/1926 | Matthews | 423/400 |
| 2,525,938 | 10/1950 | Peck | 250/544 |
| 2,936,548 | 5/1960 | Morrison | 47/58 |
| 2,943,419 | 7/1970 | Harris, Jr. | 47/58 |
| 2,947,112 | 8/1960 | Morrison | 47/58 |
| 3,308,050 | 3/1967 | Denis | 250/542 |
| 3,623,265 | 11/1971 | Brunton et al. | 47/1.3 |
| 3,657,107 | 4/1972 | Herriman et al. | 250/542 |
| 3,666,408 | 5/1972 | Grosse et al. | 423/405 |
| 3,866,041 | 2/1975 | Attia | 250/544 |
| 3,888,652 | 6/1975 | Yie et al. | 71/61 |
| 4,010,897 | 3/1977 | Treharne et al. | 239/8 |

FOREIGN PATENT DOCUMENTS 241413 10/1925 United Kingdom .

OTHER PUBLICATIONS

Safrany, "Nitrogen Fixation", *Scientific American*, vol. 231, No. 4, pp. 66-80, (1974).
Ephraim, *Inorganic Chemistry*, 5th Ed. Revised, Interscience Publishers, Inc., N.Y., (1949), pp. 480-704.

*Primary Examiner*—Deborah L. Kyle
*Attorney, Agent, or Firm*—Biebel, French & Nauman

[57] ABSTRACT

An arc reactor device for producing nitrogen oxides by an arc discharge process includes an electrically conductive casing, defining an arc discharge chamber therein, and an electrically conductive discharge electrode electrically insulated from the casing and extending into the chamber. An arc discharge potential is applied between the discharge electrode and the casing to produce electrical arcing. A starter electrode extends into the chamber and is movable from an extended position in which it contacts the discharge electrode, to a retracted position, in which the starter electrode is out of contact with the discharge electrode. A means for moving the starter electrode from the extended position, at initiation of operation, to the retracted position and maintaining the starter electrode in the retracted position during operation of the arc reactor device includes a solenoid actuator. Air is supplied to the electrically conductive casing from several manifolds which surround the casing. A plurality of orifices extend between manifold chambers, defined by the manifolds, and the discharge chamber with the orifices producing a nonturbulent spiral flow of air in the discharge chamber.

9 Claims, 4 Drawing Figures

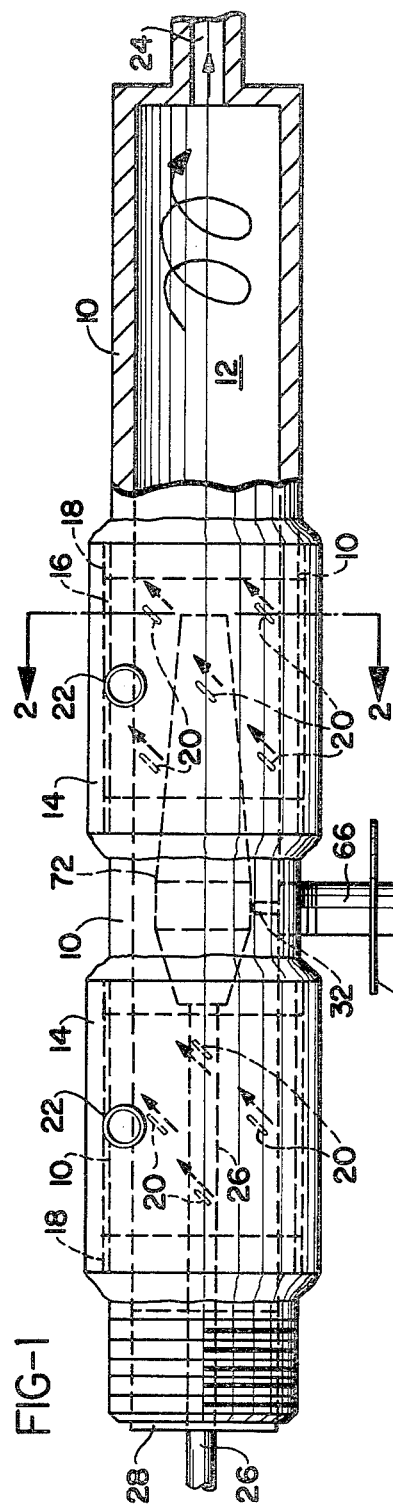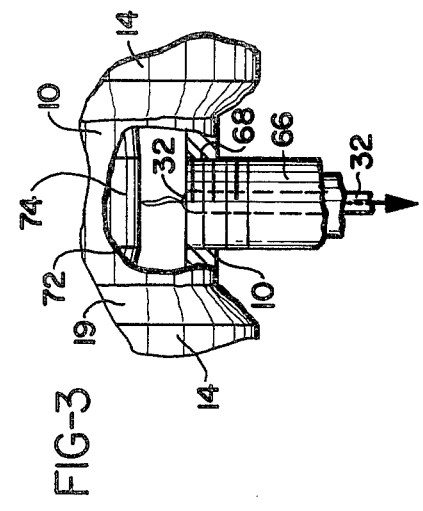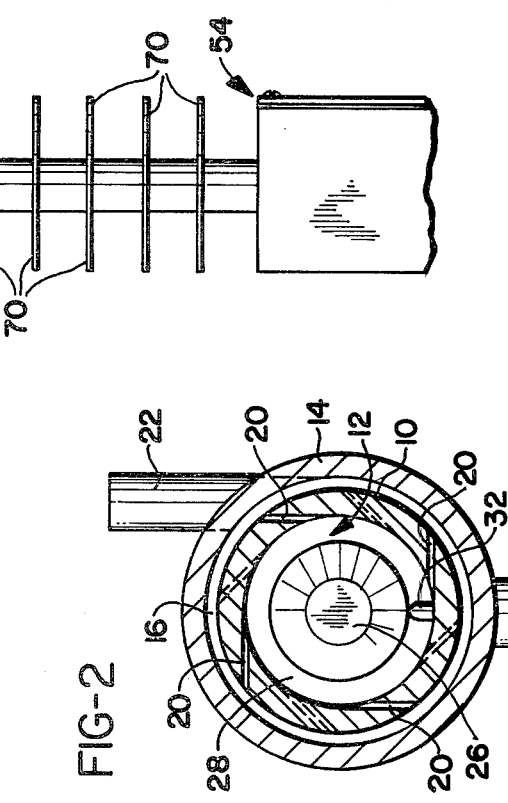

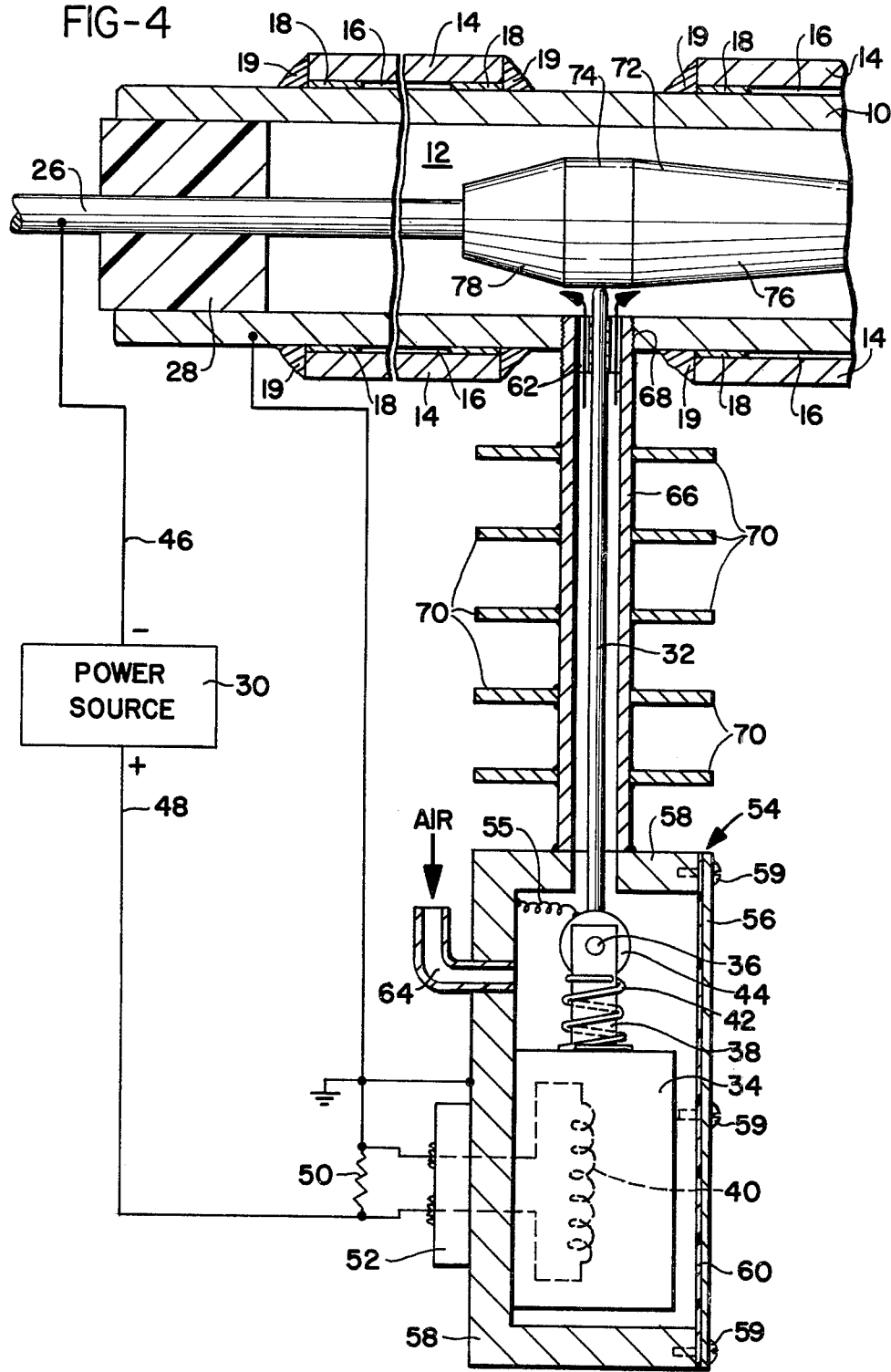

ARC REACTOR DEVICE

BACKGROUND OF THE INVENTION

The present invention relates to a device for the production of fixed nitrogen and, more particularly, to a device for producing nitrogen oxides by an electric arc discharge process.

Nitrogen is an essential material in the production of fertilizers. While it is the major component of the atmosphere (79 percent in dry air), nitrogen can be incorporated into most living systems only in the "fixed" form and nitrogen is less abundant in its fixed form. For agricultural purposes, it is desirable to supplement the natural sources of fixed nitrogen with chemical fertilizers. Typically, chemical fertilizers contain nitrogen which is fixed by industrial methods in which nitrogen is combined with hydrogen to form ammonia.

The principal industrial method for producing ammonia is the Haber process. In the Haber process, one molecule of nitrogen and three molecules of hydrogen combine at elevated temperature and pressure in the presence of a catalyst to form two molecules of ammonia. The hydrogen utilized in the Haber process is obtained primarily from natural gas and liquid hydrocarbons. As long as there is a ready and inexpensive supply of hydrogen, the Haber process is unequaled in cost and efficiency for producing fixed nitrogen fertilizers. However, because of waning supplies of natural gas and oil, the source of supply of hydrogen has decreased, and there has been a concomittant rise in its price. The demand for fixed nitrogen continues to grow, however, due to world population increases and the introduction of nitrogeneous fertilizers in the underdeveloped regions of the world. Thus it would appear likely that the cost of fixed nitrogen will continue to increase.

Accordingly, an investigation has begun into nitrogen fertilizer production methods other than the Haber process. See, for example, Safrany, "Nitrogen Fixation", *Scientific America*, Vol. 231, No. 4, pp. 64-80 (1974), wherein the following possible alternatives are discussed: biological fixation, metallo-organic, thermal activation, and low temperature ionization.

Many of these alternatives strive to produce various nitrogen oxides, which with water addition will form nitric acid ($HNO_3$). That is, depending on conditions, the reaction of nitrogen gas and oxygen gas will form one or more of the following nitrogen oxides: NO, $N_2O_3$, $NO_2$, or $N_2O_4$. Safrany states that it is easiest to discuss the reaction as producing nitric oxide $$(N_2 + O_2 = 2NO)$$

It should be realized, however, that nitric oxide (NO) readily combines with oxygen at room temperature in an exothermic reaction to form nitrogen dioxide ($NO_2$). Thus, the reaction $N_2 + 2O_2 = 2NO_2$ can be said to be favored since nitrogen dioxide has the lowest heat of formation.

In any event, for production of the nitrogen oxides, Safrany finds low-temperature ionization to be the most attractive alternative. He states:

"Low-temperature ionization has the significant advantage that in princple all the molecules of the gas can be ionized or excited. The activation can be accomplished by subjecting the air to an electrical potential of a few thousand volts, so that a low-temperature discharge is initiated, or by exposing air to an intense flux of ionizing radiation inside a nuclear reactor. In either case the gas molecules are bombarded by fast-moving ions and the collisions are inelastic. The resulting cascade of reactions can produce a substantial yield of nitrogen oxides."

The basics of using an electrical arc discharge for production of nitrogen oxides are well known. See, for example, Ephram, *Inorganic Chemistry*, Fifth Edition Revised, 1949, pp. 680-704. However, the art has also long recognized that difficulties exist with the arc discharge process. Thus in Ephram at page 683 it is stated:

The percentage of nitric oxides in the equilibrium $N_2 + O_2 = 2NO$ is:

| Temperature (°F.) | Percent |
|---|---|
| 1500° | 0.1 |
| 2000° | 0.61 |
| 2500° | 1.79 |
| 2900° | 3.20 |
| 3200° | 4.43 |
| 4200° | 10.00 |

In order to obtain a fair yield an exceptionally high temperature must be employed; 4200° F. corresponds approximately to that attained in the electric arc, and a favorable yield can then be obtained. At this temperature, however, not only the establishment of the equilibrium, but also the back decomposition, is very rapid, and it is necessary to bring the nitric oxide formed to a region of lower temperature as quickly as possible to avoid a great part of it being lost. This is carried out by having the arc suitably constructed, so that either it is spread out by an electro-magnet into a thin disc of flame, through which the N-O mixture (air) is blown, or the arc is kept in motion in the form of a sinuous, narrow, spiral band, or is forced into a water-cooled iron tube. In this way, on a laboratory scale, up to 8 percent of the mixture has been converted to nitric oxide, and in technical operations, up to 2.5 percent. It is not only the thermal effect of the arc which is responsible for the formation of nitric oxide; under the influence of strong electric fields (silent discharges), oxygen and nitrogen are decomposed into atoms which can then combine to form nitric oxide. This process must also play a part in the arc process."

A number of arc reaction chamber designs have been proposed for production of nitrogen oxides. As shown in U.S. Pat. No. 4,010,897, issued Mar. 8, 1977, to Treharne et al, assigned to the assignee of the present invention, an arc discharge device may typically comprise a casing defining a cylindrical chamber in which is positioned a discharge electrode. The discharge electrode is electrically insulated from the chamber and when sufficient electrical potential is applied between the discharge electrode and the casing, electrical arcing in the chamber results. Air is supplied to the chamber through an inlet adjacent the discharge electrode mounting and passes along the discharge electrode to an outlet at the opposite end of the chamber. Air containing the nitrogen oxides produced by the discharge process, as discussed above, is removed from the chamber through the outlet and may thereafter be inserted into solution in water or an alkaline solution. An alternative discharge chamber design is disclosed in which the chamber is generally conical in shape such that the discharge electrode and the interior chamber surface define a spark gap which increases in dimension toward the chamber outlet opening. Arcs between the electrode and the casing move toward the outlet opening, resulting in a pumping action which tends to draw air into the chamber and move the gases in the chamber toward the outlet opening.

U.S. Pat. No. 1,453,435, issued May 1, 1923, to Buettner, and U.S. Pat. No. 3,666,408, issued May 30, 1972, to Grosse et al, disclose arc discharge devices for production of nitrogen oxides in which the discharge electrode extends downward in the discharge chamber. In the Buettner chamber arrangement, the bottom of the chamber is filled with water, with the arcing occurring between the discharge electrode and the water. The nitrogen oxides which are formed as a result of arcing are absorbed into the water.

One problem which is encountered with arc discharge reactors is initiation of arcing at start up of the reactor devices. If the arc air gap is substantial, it should be appreciated that a rather large electrical potential must be applied to the discharge electrode in order for the break down potential of the air in the arc path to be exceeded. Once an arc is established, and gases in the arc path are ionized, however, a substantially smaller discharge potential is required to maintain the arcing process. In order to reduce the power requirements for the discharge chamber, it is desirable to operate the chamber at a relatively low discharge potential. One arc discharge chamber arrangement, illustrated in U.S. Pat. No. 1,130,941, issued Mar. 9, 1915, to Summers, utilizes a separate power supply for providing a high voltage potential to the discharge electrodes at initiation of arcing, with a lower potential power source being provided for maintenance of the arc. It will be appreciated that such a dual power source unduly complicates the arc discharge device.

Another problem associated with arc reactor devices, of the type to which the present invention is directed, is production of a relatively nonturbulent air flow of substantial volume through the arc chamber. If the air flow is sufficiently turbulent, the arc will be blown out. Thus, the flow rate through discharge chambers utilized in prior art has been limited, since a high flow rate produced turbulent flow which tended to extinguish electrical arcing.

Accordingly, it is seen that there is a need for an improved arc discharge reactor for production of nitrogen oxides in which the device is simple in construction, and start up is facilitated while maintaining a high flow rate of air through the discharge chamber.

SUMMARY OF THE INVENTION

An arc reactor device for producing nitrogen oxides by an arc discharge process includes an electrically conductive casing, defining an arc discharge chamber therein, and having inlet opening means and outlet opening means communicating with said chamber. An electrically conductive discharge electrode is electrically insulated from the casing and extends into the chamber. A power source means applies an arc discharge potential between the discharge electrode and the casing, thereby producing electrical arcing between the discharge electrode and the casing to form nitrogen oxides from air supplied to the chamber through the inlet opening means. The nitrogen oxides are removed from the chamber through the outlet opening means. A starter electrode extends into the chamber and is movable from an extended position, in which the starter electrode contacts the discharge electrode, to a retracted position, in which the starter electrode is out of contact with the discharge electrode. The starter electrode is electrically connected to the casing. A means is provided for moving the starter electrode from the extended position, at initiation of operation of the arc reactor device, to the retracted position and maintaining the starter electrode in the retracted position during operation of the arc reactor device. Arcing is thus initiated between the starter electrode and the discharge electrode and, thereafter, occurs between the discharge electrode and the casing.

The means for moving the starter electrode may comprise a solenoid autuator, coupled to the starter electrode and electrically connected to the power source means. The solenoid actuator withdraws the starter electrode from the extended position to the retracted position as the arc discharge potential is applied between the discharge electrode and the casing. The means for moving the starter electrode further includes spring means for applying a spring force to the starter electrode which urges the starter electrode toward its extended position. The power source means may comprise a d.c. power source having a first power output terminal connected to the discharge electrode, and a second power output terminal, connected to the casing through a resistor. The solenoid actuator includes a solenoid coil connected electrically in parallel with the resistor. When the coil is energized, the actuator moves the starter electrode to its retracted position. The casing and the starter electrode are electrically grounded.

The means for moving the starter electrode may further comprise an actuator casing in which are mounted the solenoid actuator and the starter electrode. The actuator casing defines an electrode opening communicating with the chamber, and through which the starter electrode extends. The actuator casing may define an air inlet. The electrode opening may be substantially larger than the starter electrode, whereby air supplied under pressure through the air inlet passes into the chamber through the electrode opening. The actuator casing may include cooling fins for dissipating heat from the actuator casing, the solenoid actuator, and the starting electrode.

The arc discharge chamber may be substantially cylindrical with the discharge electrode including an enlarged end portion positioned in the chamber. The enlarged end portion of the discharge electrode has its largest diameter adjacent the point at which the starter electrode contacts the discharge electrode.

The inlet opening means may comprise a manifold means surrounding the conductive casing and defining a closed manifold chamber therewith, a plurality of air supply orifices extending between the manifold chamber and the arc discharge chamber, and providing air flow therebetween, and means for supplying pressurized air to the closed manifold chamber. The air supply orifices are arranged to produce a nonturbulent spiral air flow in the chamber toward the outlet opening means.

Accordingly, it is an object of the present invention to provide an arc reactor device for producing nitrogen oxides by an arc discharge process in which a movable starter electrode is initially positioned adjacent a discharge electrode and, thereafter, is withdrawn from the discharge electrode to produce arcing between the discharge electrode and the casing defining an arc discharge chamber; to provide such an arc reactor device in which a plurality of inlet orifices supply air to the discharge chamber, producing a nonturbulent spiral air flow within the chamber; and to provide such an arc reactor device in which a solenoid actuator is utilized to withdraw the starter electrode from the arc discharge electrode at initiation of operation of the arc reactor device.

Other objects and advantages of the invention will be apparent from the following description, the accompanying drawings and the appended claims.

BRIEF DESCRIPTION OF THE DRAWINGS

FIG. 1 is a side view of the arc reactor device of the present invention, with a portion of the casing broken away to reveal the arc discharge chamber;

FIG. 2 is a sectional view, taken generally along line 2—2 in FIG. 1;

FIG. 3 is an enlarged portion of the reactor device, similar to FIG. 1, with portions broken away to reveal the retracted starter electrode; and FIG. 4 is a view, similar to FIG. 1, with portions of the device in section, illustrating the starter electrode and the means for moving the starter and depicting schematically the electrical supply circuitry incorporated in the arc reactor device.

DETAILED DESCRIPTION OF THE PREFERRED EMBODIMENT

Reference is made to FIGS. 1-4, which illustrate the arc reactor device of the present invention. An electrically conductive casing 10 defines an arc discharge chamber 12 therein. Chamber 12 is preferably cylindrical in shape. Inlet opening means and outlet opening means are provided which communicate with chamber 12 and provide a means of supplying air to chamber 12 for the generation of nitrogen oxides and removing the air and nitrogen oxide mixture from the chamber 12, respectively. The inlet opening means comprises a manifold means formed of pipe sections 14 which surround casing 10 and define closed manifold chamber 16 therewith. Pipe sections 14 engage rings 18 with sections 14 and rings 18 being secured to casing 10 by welds 19. A plurality of air supply orifices 20 extend between the manifold chamber 16 and the arc discharge chamber 12 and provide air flow therebetween. Tubes 22 supply pressurized air to the closed manifold chambers 16 from a conventional air compressor device.

As seen in FIG. 2, the air supply orifices 20 are generally tangential with respect to the wall of chamber 12. Additionally, as illustrated in FIG. 1, orifices 20 direct air passing therethrough generally toward the outlet means 24. There may typically be provided on the order of 24 such orifices 20 and, therefore, the air flow through any one orifice is relatively small. Should any one of the orifices become clogged, the effect upon the flow of air to chamber 24 will be minimal. Air flow rates on the order of 50-100 liters per minute are attainable with a nonturbulent spiral air flow being produced in chamber 12 toward the outlet opening 24. This nonturbulent air flow is significant, as discussed below, in that a relatively large quantity of nitrogen oxides may be produced without the arc being extinguished. As is known in the prior art, the air and the nitrogen oxides leaving the chamber 12 through outlet 24 may be passed through water, an alkaline solution or solutions containing additional fertilizer components, to produce a liquid fertilizer including fixed nitrogen.

An electrically conductive discharge electrode 26 is positioned such that it extends into chamber 12 and is electrically insulated from casing 10. The electrode 26 is mounted in nonconductive bushing 28.

A power source means, including a d.c. power source 30, applies an arc discharge potential between the discharge electrode 26 and the casing 10, thereby producing electrical arcing between the electrode 26 and the casing 10 to form nitrogen oxides from air supplied to the chamber 12 through the orifices 20. The nitrogen oxides are removed from the chamber along with the remaining air through the outlet opening 24. The d.c. power source 30 may comprise a current limited power source supplying a maximum potential of 3000 volts at no load and 1000 volts at 3 amps. Power source 30 is current limited such that no more than 3 amps may be supplied by the power source to the arc reactor device.

In order to facilitate start up of the arc reactor device, a starter electrode 32 is provided which extends into the chamber 12 and is movable from an extended position, shown in FIGS. 1, 2, and 4, to a retracted position, illustrated in FIG. 3. In its extended position, the starter electrode 32 contacts the discharge electrode 26, while when in its retracted position, the starter electrode 32 is out of contact with the discharge electrode 26 and, may preferably be withdrawn by a distance substantially equal to the spacing between the wall of chamber 12 and the electrode 26.

A means is provided for moving the starter electrode from its extended position to its retracted position. Arcing is initiated between the starter electrode 32 and the discharge electrode 26 when the electrodes are very close together. The arc so produced is then drawn out toward the casing wall defining chamber 12 as the starter electrode 32 is retracted. By this technique, the voltage required to initiate operation of the arc reactor device is reduced substantially.

The means for moving the starter electrode may include a solenoid actuator 34 which is coupled to the starter electrode 32 by pin 36, as shown in FIG. 4. The solenoid actuator 34 includes an actuator arm 38 connected to the solenoid armature. When the solenoid coil, illustrated diagrammatically at 40, is energized, arm 38 is retracted, with the result that starter electrode 32 is withdrawn from its extended position into its retracted position. A spring means including coil spring 42 engages the solenoid actuator 34 and the enlarged portion 44 of starter electrode 32 and applies a spring force to the starter electrode 32 which urges the electrode toward its extended position. The power source means includes d.c. power source 30 having a first power output terminal 46 connected to the discharge electrode 26 and a second power output terminal 48 connected to the casing 10 through resistor 50. The solenoid coil 40 is connected electrically in parallel with resistor 50 via connector box 52. Resistor 50 may typically be on the order of 3 ohms. It will be appreciated, therefore, that when power source 30 applies an arc potential between discharge electrode 26 and casing 10, a voltage is simultaneously applied to solenoid coil 40. As the starter electrode is retracted, arcing is initiated between electrode 32 and electrode 26.

The means for moving the starter electrode 32 further comprises an actuator casing 54 in which are mounted the solenoid actuator 34 and the starter electrode 32. The starter electrode 34 is grounded to the casing 54 by conductor 55. Casing 54 includes cover plate 56 which is attached to the casing structure 58 by screws 59. Gasket 60 provides a seal between the cover plate 56 and the actuator casing structure 58. Casing 54 defines an electrode opening 62 which communicates with the chamber 12 and through which the starter electrode 32 extends. The actuator casing 54 further defines an air inlet 64. Pressurized air is supplied to inlet 64 and passes into the chamber 12 through the electrode opening 62. This air flow cools the starter electrode 32 and the solenoid actuator 34 and, at the same time, prevents rust particles which may occasionally flake off of the casing 10 or the electrode 26 from entering the actuator casing 54. The tubular portion 66 of actuator casing 54 has a threaded end section 68 which is threaded directly into the casing 10. Tubular section 66 further includes cooling fins 70 which dissipate heat from the actuator casing 54, the solenoid actuator 34, and the starter electrode 32.

As seen in FIGS. 1 and 4, the discharge electrode 26 includes an enlarged end portion 72 which has its largest diameter adjacent the point at which the starter electrode 32 contacts the discharge electrode. This large diameter portion, indicated at 74, has tapered portions 76 and 78 extending to either side thereof. As air supplied to the chamber 12 spirals around the electrode 26, the air velocity is increased by reason of a venturi action as it passes between the large diameter portion 74 and the inner wall of casing 10. This accelerated air velocity tends to move the arc somewhat to the right, as seen in FIGS. 1 and 4, such that arcing occurs along tapered portion 76. By producing longer electrical arcs in this region, where the air is moving somewhat more slowly, the efficiency of the nitrogen oxide formation process is improved. Additionally, a shorter actuation range is required of the solenoid actuator 34 than would otherwise be required if the discharge electrode 26 were of a uniform, small diameter.

Since the air flow, swirling or spiraling around the discharge electrode 26, is relatively nonturbulent, due to the arrangement of orifices 20, abrupt turbulent dissipations of ionized gases resulting from arcing do not occur. As a consequence, electric arcing is not extinguished, even though the flow rate of air forced through the chamber 12 is relatively high.

By placing the resistor 50 and the solenoid coil 40 in series with the grounded side of the power source 48, retraction of the starter electrode 32 occurs automatically at start up of the arc reactor device without the need for complicated control circuitry. Resistor 50 limits the initial voltage surge placed across the coil 40 at start up of the arc reactor device.

During operation of the arc reactor device, the electrode 26 and the casing 10 may gradually oxidize. It has been found that it is preferable to mount the arc reactor device with electrode 26 extending downward. This prevents rust particles from building up around bushing 28 and shorting electrode 26 to casing 10.

While the forms of apparatus herein described constitute preferred embodiments of the invention, it is to be understood that the invention is not limited to these precise forms of apparatus, and that changes may be made therein without departing from the scope of the invention.

What is claimed is:

1. An arc reactor device for producing nitrogen oxides by an arc discharge process, comprising:

an electrically conductive casing, defining an arc discharge chamber therein, and having inlet opening means and outlet opening means communicating with said chamber, an electrically conductive discharge electrode, electrically insulated from said casing and extending into said chamber, power source means for applying an arc discharge potential between said discharge electrode and said casing, thereby producing electrical arcing between said discharge electrode and said casing to form nitrogen oxides from air supplied to said chamber through said inlet opening means, said nitrogen oxides being removed from said chamber through said outlet opening means, said power source means including a d.c. power source connected between said discharge electrode and said casing through a resistor, a starter electrode extending into said chamber and being movable from an extended position, in which said starter electrode contacts said discharge electrode, to a retracted position, in which said starter electrode is out of contact with said discharge electrode, said starter electrode being electrically connected to said casing, and means for moving said starter electrode from said extended position at initiation of operation of said arc reactor device to said retracted position and maintaining said starter electrode in said retracted position during operation of said arc reactor device, said means for moving said starter electrode including a solenoid actuator, coupled to said starter electrode and including a solenoid coil connected electrically in parallel with said resistor, for withdrawing said starter electrode from said extended position to said retracted position as said arc discharge potential is applied between said discharge electrode and said casing and said coil is energized, and spring means for applying a spring force to said starter electrode, urging said starter electrode toward its extended position, whereby said starter electrode is returned to said extended position at termination of operation of said arc reactor device.

2. The arc reactor device of claim 1 in which said d.c. power source has a first power output terminal connected to said discharge electrode and a second power output terminal connected to said casing through said resistor.

3. The arc reactor device of claim 1 in which said casing and said starter electrode are electrically grounded.

4. The arc reactor device of claim 1 in which said means for moving said starter electrode further comprises an actuator casing in which are mounted said solenoid actuator and said starter electrode, said actuator casing defining an electrode opening communicating with said chamber, and through which said starter electrode extends.

5. The arc reactor device of claim 4 in which said actuator casing defines an air inlet and in which said electrode opening is substantially larger than said starter electrode, whereby air supplied under pressure through said air inlet passes into said chamber through said electrode opening.

6. The arc reactor device of claim 4 in which said actuator casing includes cooling fins for dissipating heat from said actuator casing, said solenoid actuator and said starting electrode.

7. The arc reactor device of claim 1 in which said conductive casing defines a substantially cylindrical arc discharge chamber and in which said discharge electrode includes an enlarged end portion positioned in said chamber.

8. The arc reactor device of claim 7 in which said enlarged end portion of said discharge electrode has its largest diameter adjacent the point at which said starter electrode contacts said discharge electrode.

9. The arc reactor device of claim 1 in which said inlet opening means comprises manifold means surrounding said conductive casing and defining a closed manifold chamber therewith, a plurality of air supply orifices extending between said manifold chamber and said arc discharge chamber, providing air flow therebetween, and means for supplying pressurized air to said closed manifold chamber.

* * * * *